US006150959A

United States Patent [19]
Germanetti

[11] Patent Number: 6,150,959
[45] Date of Patent: Nov. 21, 2000

[54] SYSTEM FOR MONITORING THE OPERATION OF AN AIRCRAFT, ESPECIALLY A HELICOPTER

[75] Inventor: Serge Alexandre Marc Germanetti, Marseilles, France

[73] Assignee: Eurocopter, Marigagne Cedex, France

[21] Appl. No.: 09/312,710

[22] Filed: May 17, 1999

[30] Foreign Application Priority Data

May 18, 1998 [FR] France ................................. 98 06225

[51] Int. Cl.⁷ ................................................. G01C 21/00
[52] U.S. Cl. ........................ 340/971; 349/945; 349/963; 349/973; 701/14
[58] Field of Search .................................. 340/963, 964, 340/971, 972, 973, 945, 669; 701/14, 35, 123, 15, 16, 29, 120

[56] References Cited

U.S. PATENT DOCUMENTS

| | | | |
|---|---|---|---|
| 3,798,626 | 3/1974 | Weichbrodt et al. | 340/669 |
| 5,050,081 | 9/1991 | Abbott et al. | 701/14 |
| 5,239,468 | 8/1993 | Sewersky et al. | 701/35 |
| 5,339,244 | 8/1994 | Stiles, Jr. et al. | 340/963 |
| 5,475,594 | 12/1995 | Oder et al. | 701/14 |
| 5,552,987 | 9/1996 | Barger et al. | 340/971 |
| 5,668,542 | 9/1997 | Wright | 340/971 |
| 5,761,625 | 6/1998 | Honcik et al. | 340/963 |
| 5,778,203 | 7/1998 | Birkedahl et al. | 701/14 |
| 5,913,912 | 6/1999 | Nishimura et al. | 701/35 |

FOREIGN PATENT DOCUMENTS

| | | | |
|---|---|---|---|
| 0408094 | 1/1991 | European Pat. Off. | G06F 15/74 |
| 9626472 | 8/1996 | WIPO | G05D 1/00 |

OTHER PUBLICATIONS

French Search report dated Feb. 5, 1999.
P. J. Gordner, et al., "The Role of Automation in the Integrated Cockpit of Tomorrow's General Aviation Aircraft," 1995 IEEE International Conference on Systems, Man and Cybernetics, Vancouver, Oct. 22–25, 1995, vol. 5, Oct. 22, 1995, pp. 4196–4200, XP000678324., Institute of Electrical and Electronics Engineers.

P. Weindorf, "The C–17 Multifunction Display A Building Block for Avionic Systems," Proceedings of the National Aerospace and Electronics Conference (NAECON), Dayton, May 18–22, 1992, vol. 2, no CONF. 44, May 18, 1992 pp. 836–842, XP000339662, Institute of Electrical and Electronics Engineers.

R. Farmer, "The Mission Computer/Electronic Display Subsystem for the C–17A Avionics Suite," Proceedings of the National Aerospace and Electronics Conference (NAECON), Dayton May 18–22, 1992, vol. 2, No. CONF. 44, May 18, 1992, pp. 843–846, XP000339663, Institute of Electronics Engineers.

Klaus–P. Gartner, et al., "Human Engineering Evaluation of a Cockpit Display/Input Device Using a Touch Sensitive Screen," Agard Conference Proceedings, No. 240, Oct. 17, 1997, pp. 7–1–13–1, XP002090775, Dayton, USA.

E. Ulbrich, et al., "Controls and Displays for Douglas Aircraft for the 1990s," Proceedings of the Digital Avionics Systems Conference, Seattle, Oct. 5–8, 1992, No. CONF. 11, Oct. 5, 1992, pp. 178–182, XP000366684, Institute of Electrical and Electronics Engineers.

Primary Examiner—Benjamin C. Lee
Assistant Examiner—Van T. Trieu
Attorney, Agent, or Firm—Stevens, Davis, Miller & Mosher, L.L.P.

[57] ABSTRACT

A system for monitoring the operation of an aircraft, especially a helicopter, which automatically provides information which relates to the operation of the aircraft. Data acquisition and processing units centralize data relating to the aircraft together and group them in information pages. At least one information page contains a flight report of at least the latest flight of the aircraft, which simultaneously provides a flight number, flight duration, number of cycles of the engines, number of cycles of the turbine, and any appropriate message regarding detected faults and/or whether any of the aircraft's limitations have been exceeded. A display unit displays the information within the view of at least one pilot of the aircraft. At the end of a flight, a selection unit automatically selects a flight report which is automatically displayed by the display.

20 Claims, 7 Drawing Sheets

SYSTEM FOR MONITORING THE OPERATION OF AN AIRCRAFT, ESPECIALLY A HELICOPTER

BACKGROUND OF THE INVENTION

1. Field of the Invention

The present invention relates to a system for monitoring the operation of an aircraft, especially a helicopter.

2. Description of the Related Art

More precisely, the present invention relates to a monitoring system of the type comprising:

- data acquisition and processing means able to provide information relating to the operation of said aircraft; and
- display means comprising at least one screen and able to display at least information provided by said acquisition and processing means, with a view to its presentation to at least one pilot of said aircraft.

Of course, for the purposes of limiting the area available, especially on the instrument panel of the aircraft, the number of screens of said display means is generally limited, as is the size of the screen or screens used. Furthermore, especially for the purposes of pilot comfort, it is preferable not to overload said screen or screens with displayed signs or values.

Accordingly, only the information deemed essential is generally depicted to the pilot(s), secondary information not being collected and/or displayed, this of course possibly being a great impediment and not allowing satisfactory monitoring of the operation of the aircraft especially in flight, since the pilot(s) is aware of only a limited part of the important information.

The efficiency of this known monitoring system is therefore reduced and often insufficient.

From an article by Farmer, entitled "The mission computer/electronic display subsystem for the C-17A avionics suite" (IEEE 1992), a monitoring system of this type is known. This system also comprises means for selecting formats corresponding to various modes, as well as to "sub-modes". However, only certain information deemed essential is collected and can be displayed so that this known system has the aforesaid drawbacks.

The same holds for the system described in an article by Gärtner, entitled "Human engineering evaluation of a cockpit display/input device using a touch sensitive screen" (Agard conference proceedings No. 240).

SUMMARY OF THE INVENTION

The object of the present invention is to remedy these drawbacks. It relates to a monitoring system of the aforesaid type, allowing both global and efficient monitoring of the operation of an aircraft, especially a helicopter.

According to the invention, the system for monitoring the operation of an aircraft, especially a helicopter, said system comprising:

- data acquisition and processing means able to provide information which relates to the operation of said aircraft and which is grouped together in information pages;
- display means able to display at least information provided by said acquisition and processing means, with a view to its presentation to at least one pilot of said aircraft; and
- selection means for selecting, from among said information pages, at least one information page intended to be displayed by said display means, is noteworthy in that said acquisition and processing means centralize data relating to said aircraft and group them together, after processing as appropriate, in said information pages, in that said acquisition and processing means form at least one information page containing a flight report of at least the latest flight of said aircraft, and in that said selection means automatically select, at the end of a flight of said aircraft, said flight report which is then displayed automatically by said display means.

Thus:

- by virtue of the centralizing of the data by the acquisition and processing means, the system in accordance with the invention takes into account all the data liable to influence the operation of said aircraft, as will be seen in greater detail below;
- by virtue of the information selection capability, the pilot(s) of the aircraft can be made aware of a considerable quantity of information, especially of information which is not generally displayed in the usual systems, through lack of space, said selection being for example made as a function of specified flight conditions or flight phases or as a function of a preprocessing identifying abnormal conditions of operation and informing the pilot(s) only in this case; and
- by virtue of the invention, the flight report is automatically available at the end of each flight, consequently allowing global and efficient monitoring of the operation of the aircraft.

Furthermore, as will be seen below, by grouping the information together into homogeneous categories in the various pages, the understanding and management of the information by the pilot(s) is simplified.

Moreover, through appropriate selections, for example of two or three specified pages to be displayed simultaneously, it is always possible to provide the aircraft crew with the essential parameters, thereby also increasing the efficiency of monitoring.

Advantageously, the information to be displayed relates, especially for a helicopter:

- at least to the values of at least some of the following parameters, of at least one engine of the aircraft: the speed of rotation of the gas generator of the engine, the gas ejection temperature at the free turbine inlet, the engine torque, the temperature of the oil and the pressure of the oil; and/or
- at least to the values of at least some of the following parameters of said helicopter: the temperature and pressure of the main gearbox, electrical characteristics, the hydraulic pressure, the bending moment of the shaft of the main rotor, the quantity and pressure of the fuel and the maximum forward speed of the helicopter.

In a particular embodiment, at least some of the aforesaid information is displayed only when it represents abnormal operation.

Moreover, advantageously, said acquisition and processing means form information pages respectively containing:

- at least one first-limitation indicator representative of a parameter limiting at least one engine of said aircraft; and/or
- at least information regarding characteristics of at least one engine of said aircraft; and/or
- at least information regarding electrical characteristics of said aircraft; and/or
- at least information regarding a soundness check of at least one engine of said aircraft, as well as at least one flight report of at least the latest flight of said aircraft.

Furthermore, preferably, said flight report comprises at least some of the following information:

the flight number;

the flight duration;

the number of cycles of the engine or engines;

the total number of cycles of the engine or engines;

the number of cycles of the free turbine;

the total number of cycles of the free turbine;

as appropriate, a message indicating a detection of fault during the flight; and as appropriate, a message indicating a detection of exceedings of limitations.

Moreover, on safety grounds, said display means display said flight report solely and automatically when the engine of said helicopter is shut down and its main rotor idle.

Additionally, advantageously, said system continuously records operating parameters of at least one engine of the aircraft, as well as, as appropriate, fault information, and said selection means are formed in such a way as to allow a pilot of the aircraft to display said operating parameters and said fault information.

Thus, the pilot can track the evolution of the chosen parameters and he can, for example, make useful or necessary checks, thus enabling him to carry out efficient monitoring of said engine or engines.

Furthermore in the case of a fault, he can rapidly come to considered and objective opinion about the gravity and possible consequences of said fault.

In a particularly advantageous embodiment, said selection means automatically select information pages to be displayed, as a function of the state of said aircraft, for example a flight state or a shutdown state.

Furthermore, as a variant of and/or supplement to the above embodiment, said selection means comprise means actuatable by a pilot and formed in such a way as to allow said pilot to select the information page to be displayed, thus affording said pilot complete control over the information displayed, he being able to make the selection freely, for example, as a function of flight conditions or phases or simply in case of the need for a particular item of information.

In this case, advantageously, said actuatable means are formed in such a way as to allow cyclic selection of at least some of said information pages. Furthermore, preferably, said display means comprise at least two screens able to display information pages and solely one of said screens is used for said cyclic selection, the other always displaying the same information page, which therefore preferably contains important, or even essential information in respect of the monitoring.

Moreover, to aid the pilot's understanding and management of the information displayed, advantageously:

said display means comprise at least one screen comprising a plurality of different colors, respectively representing:

the background;

scales, indicator needles and numerical values;

first limitations and first symbologies of faults;

second limitations and second symbologies of faults;

units; and the fuel level of the aircraft;

said colors are subject to an order of priority, so as to avoid overlays of colors on said screen;

in order to highlight the value of at least one displayed parameter, with respect to at least one limit value of said parameter, said display means display, in addition to said value, at least one characteristic sign whose color and/or shape vary as a function of this value, relative to said limit value; and/or said display means comprise at least one screen comprising a liquid crystal active matrix.

Additionally, the system in accordance with the invention comprises at least one, but preferably a plurality of, replaceable modules, this making it possible rapidly to repair any fault in said system, by simply replacing the module in which this fault originates.

Moreover, advantageously, said system is constructed, at least in part, in the form of a dual architecture. In particular, said acquisition and processing means preferably comprise at least two different acquisition and processing chains and said display means comprise at least two screens associated respectively with said acquisition and processing chains.

Thus, by virtue of this dual architecture of the system in accordance with the invention, the safety of the system is considerably increased, since in the event of a fault in one part of said system (for example in a first screen), said system can continue to operate by means of the corresponding part which is not faulty (namely the second screen in the example considered).

Furthermore, according to the invention, said system is formed in such a way as to be able to acquire data via at least one unique acquisition path, said acquisition path being split inside said system for the transmission of said data to twinned parts of said dual architecture.

This makes it possible in particular to reduce the number of connectors, protections and acquisition interfaces, and hence the weight and cost of the system, without diminishing the safety thereof.

The figures of the appended drawing will elucidate the manner in which the invention may be embodied. In these figures, identical references denote similar elements.

DETAILED DESCRIPTION OF THE PREFERRED EMBODIMENT

Figure 1:
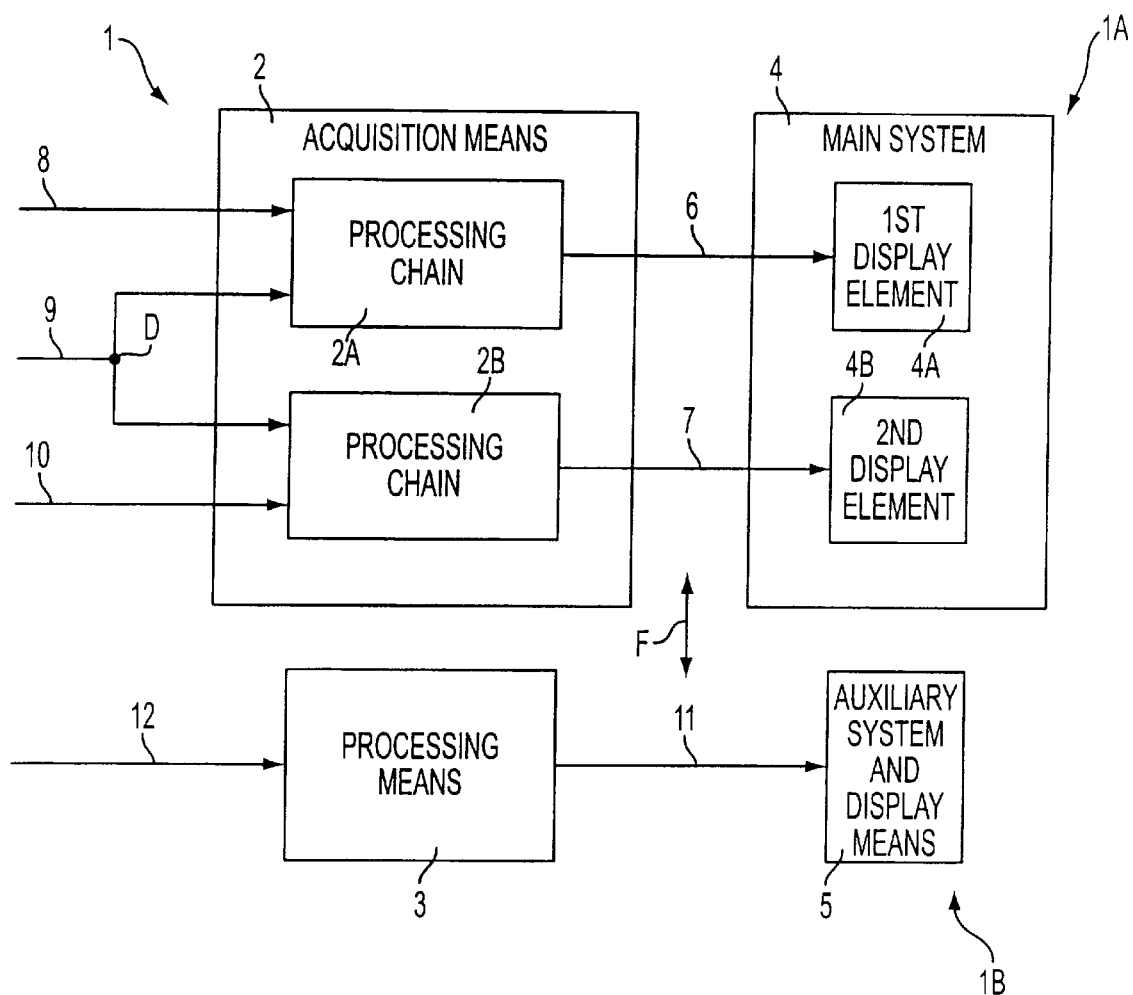
FIG. 1 is the schematic diagram of a monitoring system in accordance with the invention.

The system 1 in accordance with the invention and represented diagrammatically in FIG. 1 is intended to allow a pilot to monitor the operation of an aircraft, in this instance a helicopter (not represented).

Said system 1 is of the type comprising:

data acquisition and processing means 2 and 3 able to provide information which relates to the operation of said aircraft; and display means 4 and 5 able to display at least information provided by said acquisition and processing means 2 and 3, with a view to its presentation to at least one pilot of said aircraft.

According to the invention, said acquisition and processing means 2 and 3 centralize data relating to said helicopter and group them together, after processing as appropriate, in information pages, as will be seen in greater detail below, and said system 1 furthermore comprises selection means B3 for selecting, from among said information pages, at least one information page intended to be displayed by said display means 4 and 5.

Thus, by virtue of the centralizing of data and the capability to select the pages displayed and thus to increase the mass of information which can be provided to the pilot(s), the system 1 in accordance with the invention allows both global and very efficient monitoring of the operation of the helicopter.

Furthermore, according to the invention, said monitoring system 1 comprises a main system 1A and an auxiliary system 1B, which are specified hereafter, said auxiliary system 1B being generally provided in the case of a twin-engine helicopter.

The main system 1A has a dual structure and comprises:
- a first data acquisition processing chain 2A to which are linked, via a link 6, first display elements 4A; and
- a second data acquisition and processing chain 2B to which are linked, via a link 7, second display elements 4B.

It will be noted that in the case of a twin-engine aircraft, said chains 2A and 2B are associated respectively more particularly with the two engines of said aircraft.

To this end, the chain 2A receives data relating to a first of said engines, especially from a device for monitoring said engine of the "FADEC" type, as represented in a generalized manner by a link 8.

The same holds for the chain 2B in relation to the second of said engines, as is represented in a general manner by a link 10.

These data contain in each instance for example the values respectively of the speed of rotation of the gas generator of the engine (Ng), of the gas ejection temperature at the free turbine inlet (T4) and of the torque of the main gearbox.

Furthermore, said chains 2A and 2B receive identical data, as illustrated by a link 9 split at a point D, and in particular the values of the bending moment of the shaft of the main rotor, of the quantity and pressure of the fuel, of the oil pressure and temperature of the engine and of the main gearbox, and also the values Ng and T4 or pairs of analog values for rendering the input of the "FADEC" redundant, or alternatively a maximum forward speed of the helicopter.

According to the invention, said point D can be integrated into the equipment so as to reduce, in particular, the number of connectors, of elements for protection against lightning and of acquisition interfaces, without diminishing the global safety of the system 1.

Moreover, said system 1A is formed of replaceable modules (not represented) comprising in particular the chains 2A and 2B. Thus, in the event of a fault in one of said chains 2A and 2B, it is sufficient to replace the corresponding module, thus guaranteeing a rapid and inexpensive repair, since it is not necessary to involve the whole of the system 1.

Furthermore, and given the redundancies implemented, all of the essential parameters are always available after a chain develops a fault, so that the flight can be performed with a single operational module. We then have a situation referred to as flight under "Master Minimum Equipment List" conditions or MMEL.

Additionally, as regards the auxiliary system 1B, the acquisition and processing means 3 which are linked by a link 11 to the display means 5 receive data by way of a link 12 and in particular the values of the quantity, of the pressure and of the flowrate of the fuel.

As indicated above, said means 2 and 3 form information pages able to be displayed.

According to the invention, the means 2 form at least:
- one page P1 relating to a first-limitation indicator (IPL) representative of characteristic parameters to be limited of at least one engine of said aircraft;
- one page P2 relating to information regarding characteristics of at least one engine of said aircraft, said page P2 being depicted in greater detail below with reference to FIG. 6;
- one page P3 relating to information regarding electrical characteristics of said aircraft;
- one page P4 relating to information regarding a soundness check of at least one engine of said aircraft;
- one page P5 indicating the performance of the aircraft in relation to the weight; and
- one page P6 relating to a flight report of at least the latest flight of said aircraft; as well as possibly
- one page (not represented) providing the performance, as a function of the weight and centering of the helicopter (calculation of the position of the center of gravity) which are calculated automatically while taking account of the fulness of the various tanks, by virtue of corresponding sensors or of the slung load, also measured continuously.

By way of non-limiting examples, the various types of information which may be contained in said pages P1 to P4 and P6 are specified hereafter.

Page P1 contains for example:
- information related to the limitations of the engine or engines of the helicopter and grouped together in a global indicator. These limitations generally pertain to three parameters: the regime of the gas generator (Ng), the engine torque (Cm) and the gas ejection temperature at the free turbine inlet (T4), which are calculated by the means 2 and are grouped together in a first-limitation indicator of known type (IPL function obtained on the basis of these parameters);
- the outside temperature; and
- information related to the fuel circuit of the helicopter; as well as
- any messages intended for members of the crew, in particular messages indicating, as appropriate, a fault with the means 2A or 2B or a dissimilarity between information output respectively by these means 2A and 2B.

In a particular embodiment, a single message may be displayed, and an order of priority between the various messages to be displayed is defined. This particular embodiment may also be implemented for pages P2 and P3. Such an embodiment makes it possible, in particular, to forewarn the crew of abnormal events occurring with regard to parameters monitored, but not displayed.

Moreover, page P2 contains for example:
- primary engine parameters, such as the aforesaid parameters Ng, Cm and T4, in the form of separate indicators;
- the outside temperature;
- information relating to the fuel circuit of the aircraft; and
- any messages, such as a fault with the aforesaid IPL function.

As regards page P3, it may contain in particular:
- secondary parameters for checking the engine or engines, such as the pressure and temperature of the oil;
- parameters relating to the aircraft's electricity production system;

the flowrate of the fuel; and possibly messages.

Additionally, page P4 can display either a first page indicating the conditions to be complied with so as to perform a soundness check of an engine, and enabling the crew of the aircraft to track the evolution of said check, or a second page indicating the results of such a check, as well as the parameters used therefor.

As regards the flight report depicted on page P6, it comprises at least some of the following information:

the flight number;

the flight duration;

the number of cycles of the engine or engines;

the total number of cycles of the engine or engines;

the number of cycles of the free turbine;

the total number of cycles of the free turbine;

as appropriate, a message indicating a detection of fault during the flight; and as appropriate, a message indicating a detection of exceedings of limitations.

Figure 2A:
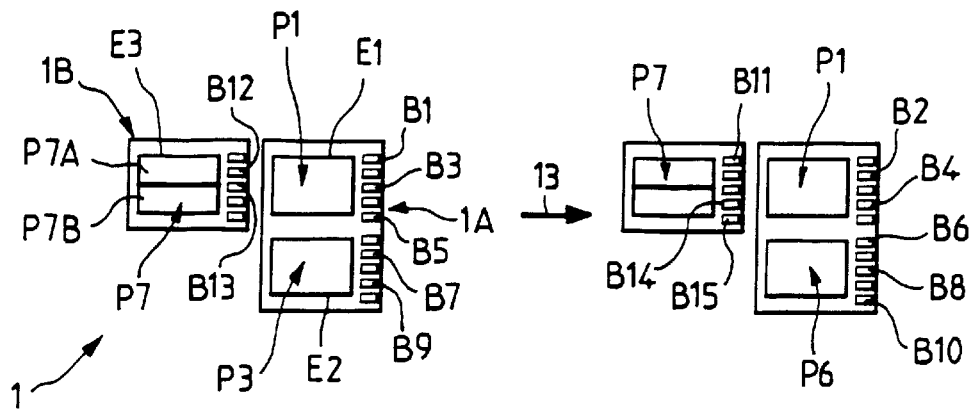
FIGS. 2A to 5C show various information pages displayed, as a function of the state of said monitoring system.

Moreover, during normal operation of the system 1, the means 5 display a page 7 which comprises, as illustrated diagrammatically in FIG. 2A:

in a first half-page P7A, advice and warnings; and in a second half-page P7B, information regarding the fuel, such as the quantity, pressure and flowrate, the flight time remaining under the current flight conditions.

As may be seen in particular in FIG. 2A, the system 1A comprises screens E1 and E2 and the system 1B a screen E3. These screens E1 to E3 are each preferably provided with a liquid crystal active matrix. Such a matrix is especially appropriate to the depicting of information relating to the present invention and offers in particular capabilities for altering the symbology, such as a choice of units used, a tailoring of the symbols or a modifying of the scales.

Accordingly, at most three of said pages P1 to P7 can be displayed simultaneously on the screens E1 to E3 by way of the system 1 in accordance with the invention.

It is therefore necessary to select the pages to displayed, which may be replaced by other pages during the flight, as specified below.

According to the invention, this selection may be made both:

automatically, by means integrated into said system 1, in particular as a function of the state of the aircraft (flight/shutdown), as will be seen below with reference to FIGS. 2A, 3A, 4A and 5A; and manually by the pilot, by way of an actuatable means, preferably a button B3 as specified below with reference to FIGS. 2B, 3B, 4B and 5B, as a function of needs or of the messages provided, as defined above.

Figure 3A:
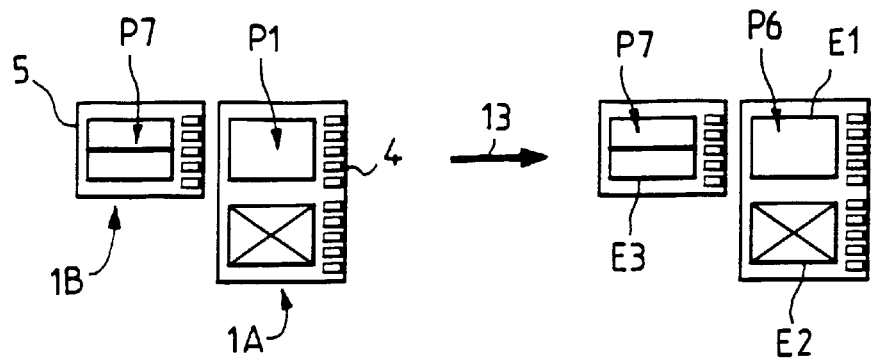

Furthermore, as may in particular be seen in FIGS. 2A and 3A, the means 4 comprise:

buttons B1 and B2 for turning on and turning off the screens E1 and E2 respectively;

the button B3 for manually selecting the pages P1 to P7 to be displayed;

a button B4 for returning to the initial state of display, during a flight;

buttons B5 to B8 for selecting, modifying and enabling a data field; and buttons B9 and B10 for modifying the brightness respectively in the two directions, of the screens E1 and E2.

As regards the means 5, they comprise:

a button B11 for turning the screen E3 on or off;

a button B12 for selecting optional characteristics;

a button B13 for selecting a data field; and buttons B14 and B15 for modifying the brightness of the screen E3.

According to the invention, during normal operation, the system 1 displays on said screens E1 to E3 respectively the aforesaid pages P1, P3 and P7 containing the essential characteristics.

Furthermore, at the end of a flight, said system 1 selects and displays the page P6, that is to say the flight report, automatically. This is represented in FIGS. 2A, 3A, 4A and 5A, where on each occasion the arrow 13 illustrates such automatic selection.

However, according to the invention, the flight report is depicted only when the engine(s) of said helicopter is shut down and when its main rotor is idle. The purpose of this is to preclude the presenting of the flight report (and hence the use of a screen) in the case of autorotation in which the rotor turns whilst the engine is shut down, since in this case the pilot needs numerous flight parameters and hence all the screens, to monitor this often critical situation.

In a particularly advantageous embodiment, the system 1 in accordance with the invention is able to depict the last n flight reports (n being an integer, for example equal to 32), thus enabling the pilot to draft several flight reports all together in one, for example in the form of a daily report.

Moreover, FIGS. 2B, 3B, 4B and 5B illustrate a manual selection in accordance with the invention in flight situations corresponding respectively to those of FIGS. 2A, 3A, 4A and 5A.

Figure 2B:
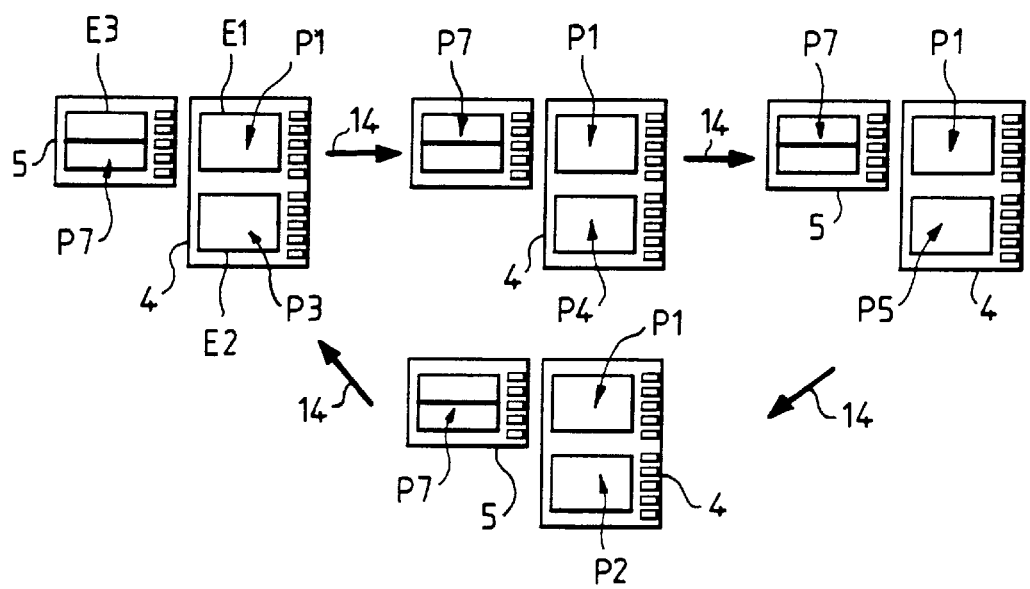
Figure 3B:
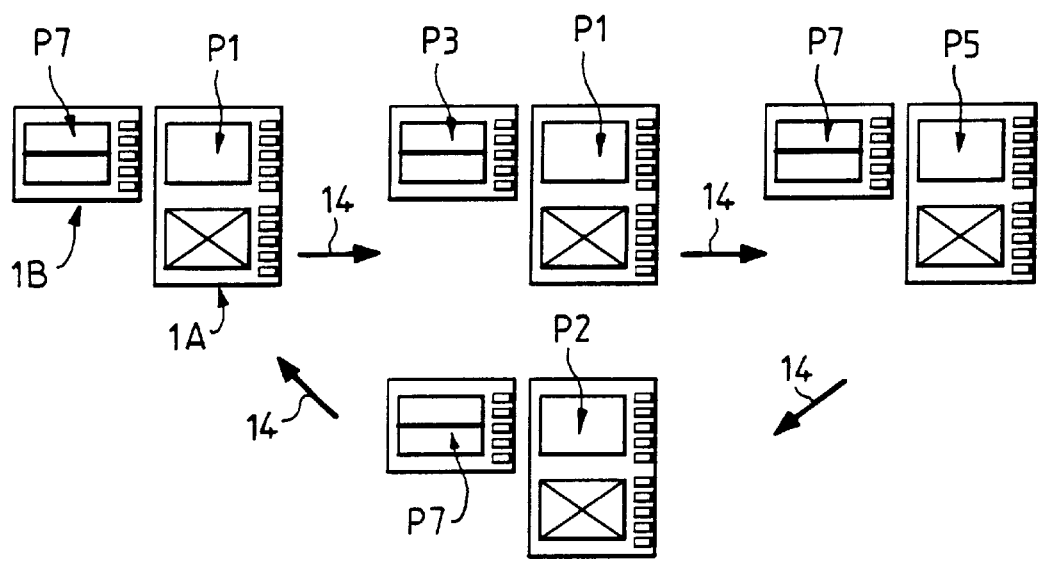
Figure 4A:
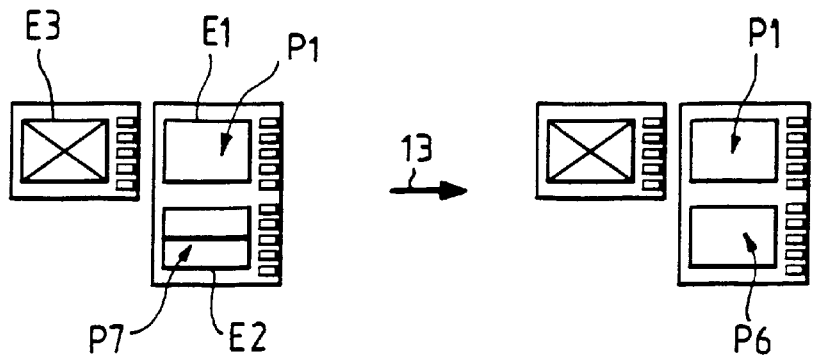
Figure 4B:
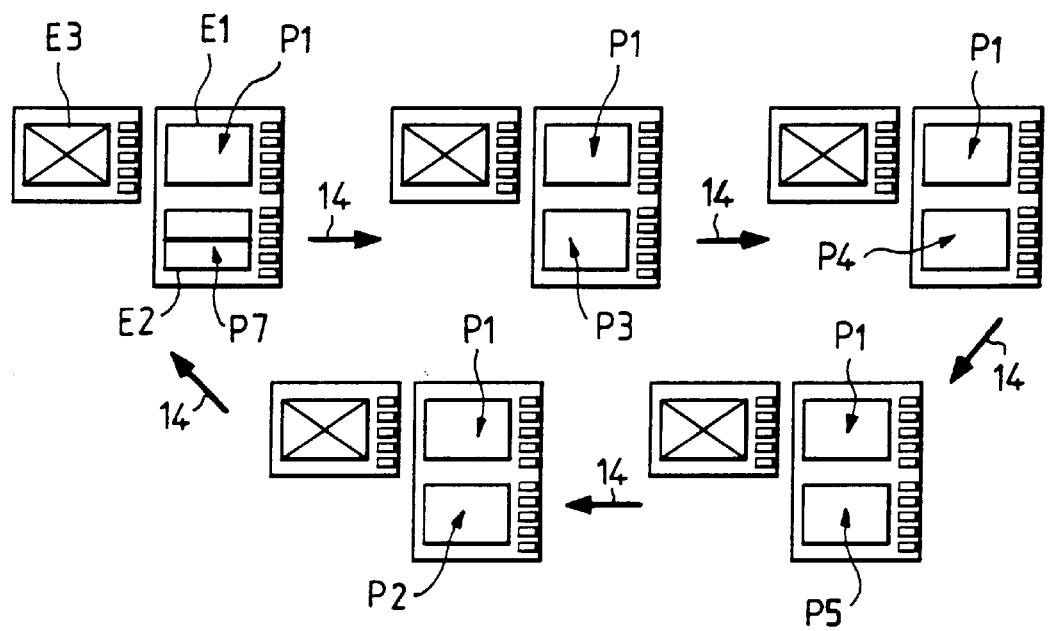
Figure 5A:
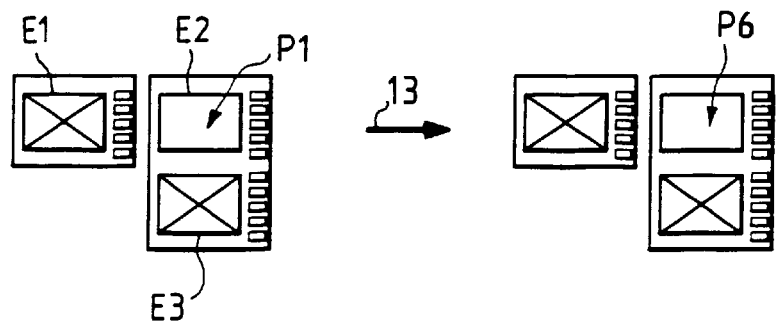
Figure 5B:
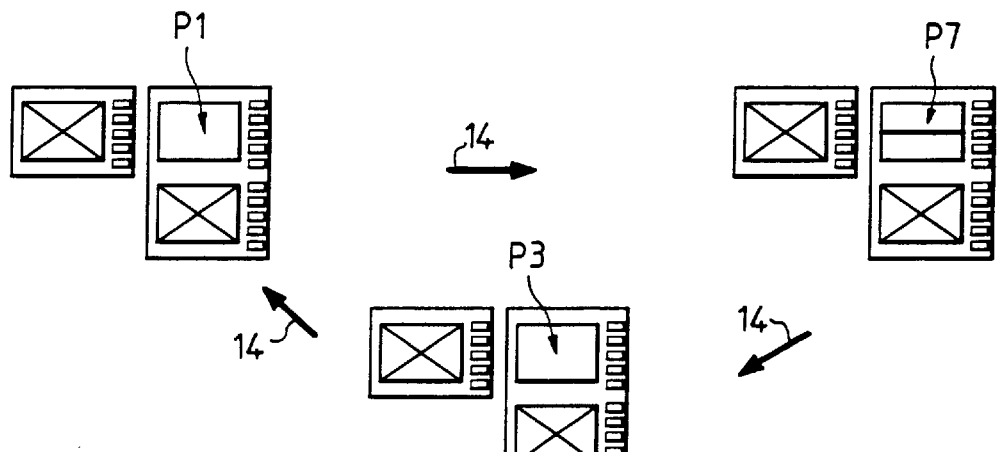
Figure 5C:
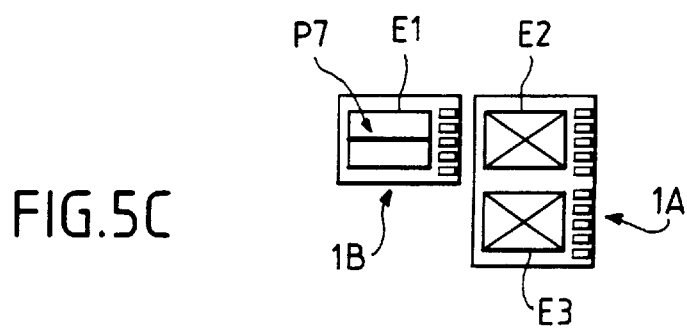

More precisely, it will be noted that:

FIGS. 2A and 2B relate to the general case in which the system 1 is operating normally;

FIGS. 3A and 3B relate to the situation in which one of the means 4A or 4B (or one of the associated means 2A or 2B) is faulty, in this instance the screen E2. Only two acquisition, processing and display chains 2A, 4A and 1B are then available;

FIGS. 4A and 4B relate to the situation in which the means 5 and/or the means 3 are faulty. Here again, only two chains (the two chains of the system 1A) are available; and FIGS. 5A, 5B and 5C illustrate the situation in which a single chain is available, namely that relating to the screen E1 for FIGS. 5A and 5B and that relating to the screen E3 for FIG. 5C (said screen E3 showing page P7 in this case).

According to the invention, the pilot makes said manual selection by actuating the button B3, such an action being represented by an arrow 14.

As may be seen in FIGS. 2B, 3B, 4B and 5B, this selection is of the cyclic type and therefore corresponds to a cyclic permutation, since after a certain number of actuations making it possible successively to highlight the various functional facilities, the initial situation is reverted to.

More precisely, in the situations represented respectively:

in FIG. 2B, the cyclic permutation acts only on the screen E2 which displays pages P3, P4, P5 and P2 in succession;

in FIG. 3B, the cyclic permutation acts in succession on the display of screens E1 and E3 which show successively the pairs of pages P1 and P7, P1 and P3, P5 and P7, P2 and P7. The relationship between the systems 1A and 1B for implementing this reciprocal action is illustrated by an arrow F in FIG. 1. It will be noted furthermore that the last two depictions PS and P7, P2 and P7 are permitted solely when the aircraft is on the ground;

in FIG. 4B, the cyclic permutation acts solely on the screen E2 which shows in succession the pages P7, P3, P4, P5 and P2, the screen E1 showing page P1 continuously; and in FIG. 5B, the cyclic permutation brings about the successive depicting of pages P1, P7 and P3 on the screen E1.

It should additionally be noted that the system 1 in accordance with the invention is not only a straightforward information display system, but represents rather an interactive system allowing information queries or searches by the crew.

Thus, as regards the engine characteristics depicted on page P2, the system 1 records, in real time, operating parameters which can be restored and displayed in the form of messages M1, Mi (i being a variable integer), in particular on request from the crew.

Furthermore, in case of a fault, it determines fault information L1, Li (identifying the type of fault or the faulty element) which can likewise be displayed on request by the crew.

Figure 6:
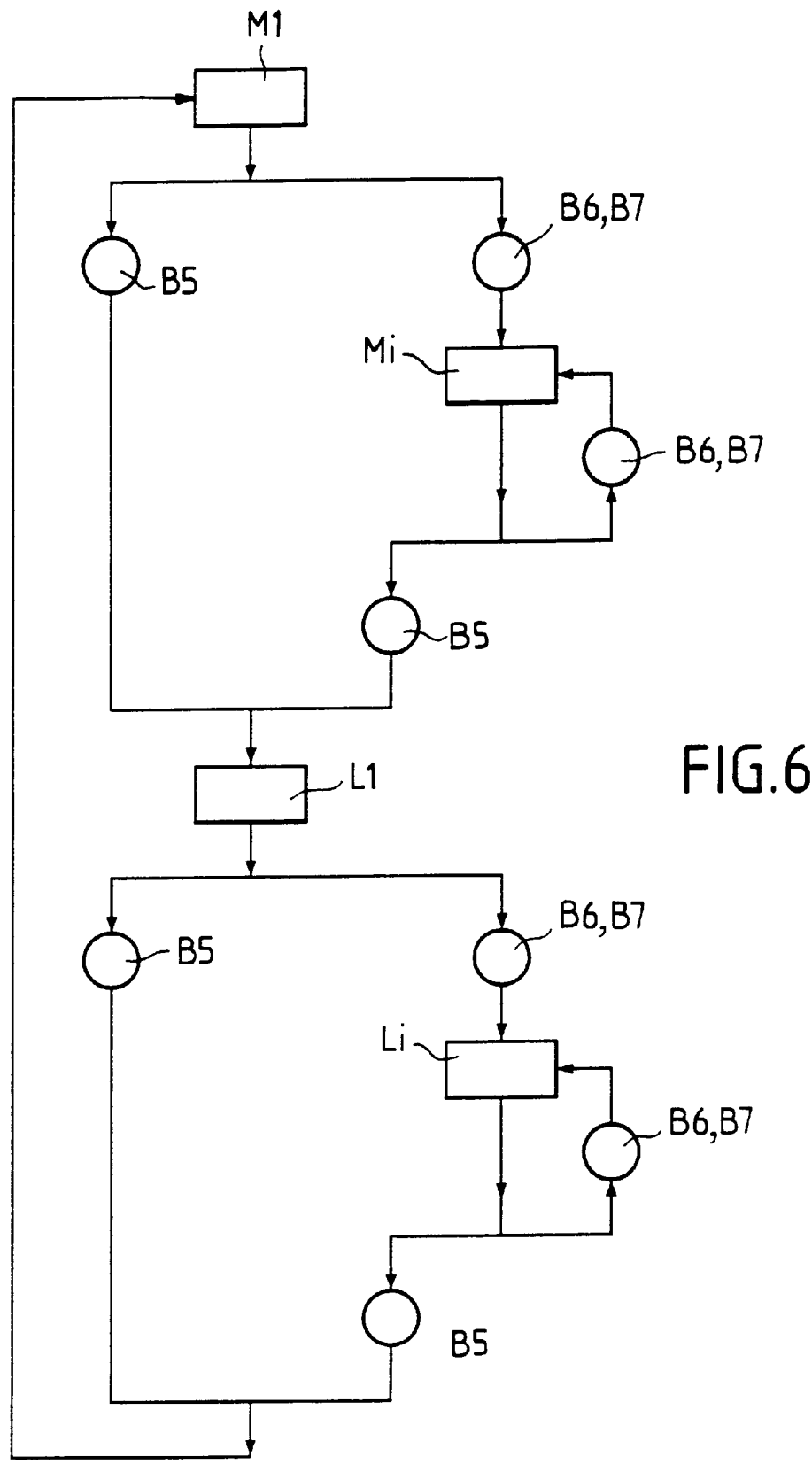
FIG. 6 diagrammatically illustrates an automaton for depicting messages.

The restoring of these various items of information M1, Mi, L1, Li assumes that page P2 is displayed and that a pilot is carrying out specified actuations, as represented diagrammatically in FIG. 6.

Thus, as may be seen in this FIG. 6:

to switch from the displaying of a message M1, Mi to that of a fault cue L1, Li, and vice versa, button B5 should be actuated; and to make various messages M1, Mi (i variable) or various fault cues L1, Li scroll on the screen in succession, button B6 or button B7 should be actuated, the actuating of one B6 of said buttons B6 and B7 bringing about scrolling in one direction, and the actuating of the other button B7 bringing about scrolling in the other direction.

By virtue of these various actuations, the crew can be made aware of the various messages formed and of the various faults identified.

Furthermore, in order that a fault or malfunction be clearly highlighted, specific symbology is provided, in a specific color, which is displayed in place of the parameter in question, for example a parameter which cannot be detected (on account of the fault) or a parameter whose value exceeds a specified limit value.

Additionally, generally, to aid the crew's understanding and management of the information displayed, each of said screens E1 to E3 is provided according to the invention with a plurality of different colors, respectively representing:

the background;

scales, indicator needles and numerical values;

first limitations and first symbologies of faults;

second limitations and second symbologies of faults;

units; and the fuel level of the aircraft.

Figure 7:
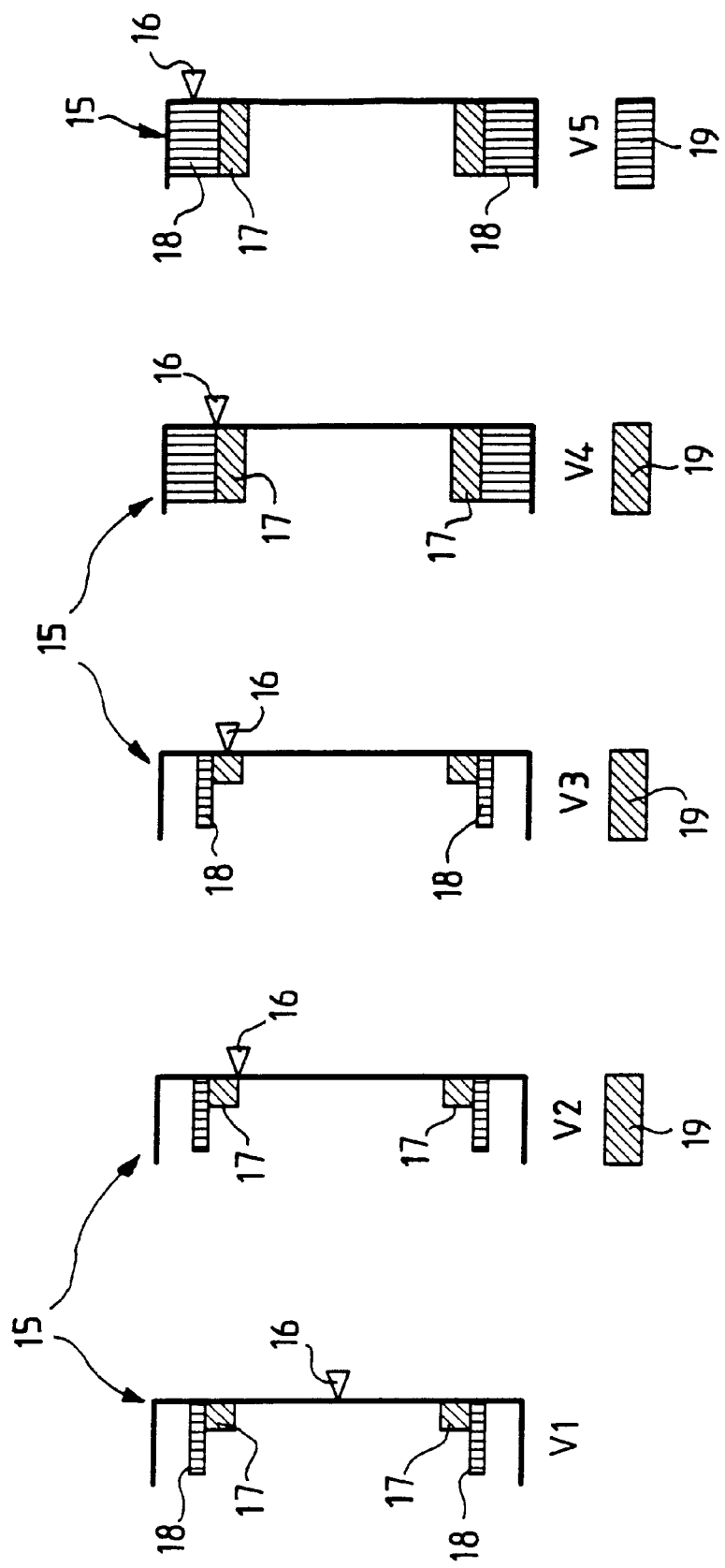
FIG. 7 illustrates an indicator of the value of a parameter, for various values of said parameter.

Additionally, for the depicting of important parameters, such as the outside temperature or the pressure, use is made of a specific indicator 15 represented diagrammatically in FIG. 7. This indictor 15 comprises:

a mobile cursor 16;

two pairs of two ranges 17 and 18 of different colors, for example yellow and red, of variable sizes, between a maximum size and a minimum size, and in each instance illustrating first and second limitations (upper and lower) of said parameter;

an indication of the effective value of said parameter (V1 to V5); and a symbol 19 of variable color underlining said indication.

According to the invention, as long as the value V1 of the parameter lies between said first upper and lower limitations, the symbol 19 is absent and the pairs of ranges 17 and 18 are at their minimum size. Then, for a variable of said parameter, increasing in the example represented:

when the value V2 or V3 of said parameter lies between said first and second (upper or lower) limitations, the symbol 19 appears in the color of the ranges 17 (relating to said first limitation);

when the value V4 of said parameter reaches the second limitation, the ranges 17 and 18 take their maximum size; and finally when said second limitation is exceeded, the symbol 19 takes the color of the range 18 and the corresponding value V5 flashes.

What is claimed is:

1. A system for monitoring the operation of a helicopter, said system comprising:

data acquisition and processing means for providing information automatically which relates to operation of said helicopter, said information being grouped together in a plurality of information pages (P1 to P7) and centralized by said acquisition and processing means, after processing, wherein said acquisition and processing means form at least one information page (P6), from said plurality of information pages (P1 to P7), which contains a flight report of at least a latest flight of said helicopter, and said flight report comprises simultaneously at least the following information:

a flight number, a flight duration, a number of cycles of an engine or engines, a total number of cycles of the engine or engines, a number of cycles of a free turbine, a total number of cycles of the free turbine, and, at least one of:

a message indicating a detection of fault during the flight and a message indicating a detection of exceeding limitations of said helicopter;

display means for displaying within view of at least one pilot of said helicopter at least the information provided by said acquisition and processing means; and selection means for selecting, from among said plurality of information pages grouped together by said data acquisition and processing means, said at least one information page (P6) for display by said display means; and wherein:

said selection means automatically selects, at an end of a flight of said helicopter, said flight report which is displayed automatically by said display means, only when an engine of said helicopter is shut down and a main rotor of said helicopter is idle.

2. The system as claimed in claim 1, wherein the information to be displayed relates at least to the values of at least one of the following parameters, of at least one engine of the aircraft: the speed of rotation of the gas generator of the engine, the gas ejection temperature at the free turbine inlet, the engine torque, the temperature of the oil and the pressure of the oil.

3. The system as claimed in claim 1, wherein, in the case of a helicopter, the information to be displayed relates to at least the values of at least one of the following parameters of said helicopter: the temperature and pressure of the main gearbox, electrical characteristics, the hydraulic pressure, the bending moment of the shaft of the main rotor, the quantity and pressure of the fuel and the maximum forward speed of the helicopter.

4. The system as claimed in claim 1, wherein said acquisition and processing means form an information page (P1) containing at least one first-limitation indicator representative of a parameter limiting at least one engine of said aircraft.

5. The system as claimed in claim 1, wherein said acquisition and processing means form an information page (P2) containing at least information regarding characteristics of at least one engine of said aircraft.

6. The system as claimed in claim 1, wherein said acquisition and processing means form an information page (P3) containing at least information regarding electrical characteristics of said aircraft.

7. The system as claimed in claim 1, wherein said acquisition and processing means form an information page (P4) containing at least information regarding a soundness check of at least one engine of said aircraft.

8. The system as claimed in claim 1, wherein it continuously records operating parameters of at least one engine of the aircraft, as well as, as appropriate, fault information, and wherein said selection means allow a pilot of the aircraft to select a display of said operating parameters and said fault information.

9. The system as claimed in claim 1, wherein said selection means automatically select said plurality of information pages (P1 to P7) to be displayed, as a function of the state of said aircraft.

10. The system as claimed in claim 1, wherein said selection means comprise actuatable means which are actuatable by a pilot select an information page from said plurality of information pages (P1 to P7) to be displayed.

11. The system as claimed in claim 10, wherein said actuatable means allow cyclic selection of at least one of said plurality of information pages (P1 to P7).

12. The system as claimed in claim 11, wherein said display means comprise at least two screens able to display said plurality of information pages (P1 to P7) and wherein solely one of said screens is used for said cyclic selection.

13. The system as claimed in claim 1, wherein said display means comprise at least one screen comprising a plurality of different colors, respectively representing:

a background;

scales, indicator needles and numerical values;

first limitations and first symbologies of faults;

second limitations and second symbologies of faults;

units; and a fuel level of the aircraft.

14. The system as claimed in claim 13, wherein said colors are subject to an order of priority, so as to avoid overlays of colors on said said at least one screen.

15. The system as claimed in claim 1, wherein, in order to highlight a limit value (V1 to V5) of at least one displayed parameter, with respect to at least one limit value of said parameter, said display means display, in addition to said value (V1 to V5), at least one characteristic sign whose color and/or shape vary as a function of this value, relative to said limit value.

16. The system as claimed in claim 1, wherein said display means comprise at least one screen comprising a liquid crystal active matrix.

17. The system as claimed in claim 1, compromising at least one module.

18. The system as claimed in claim 1, compromising at least in part, a dual architecture construction.

19. The system as claimed in claim 18, wherein said acquisition and processing means comprise at least two different acquisition and processing chains and wherein said display means comprise at least two screens associated respectively with said acquisition and processing chains.

20. The system as claimed in claim 18, wherein said acquisition and processing means acquires data via at least one unique acquisition path, said acquisition path being split inside said system so as to allow the transmission of said data to twinned parts of said dual architecture.

* * * * *